United States Patent
Allard et al.

(10) Patent No.: US 12,485,871 B1
(45) Date of Patent: Dec. 2, 2025

(54) VEHICLE TORQUE RESPONSE AND MAGNITUDE ADAPTION BASED ON CONTROLLER AREA NETWORK RESPONSE

(71) Applicant: FCA US LLC, Auburn Hills, MI (US)

(72) Inventors: Corey Allard, Auburn Hills, MI (US); Joshua Rohrer, Auburn Hills, MI (US); Javed Dada, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/801,935

(22) Filed: Aug. 13, 2024

(51) Int. Cl.
*B60W 10/06* (2006.01)

(52) U.S. Cl.
CPC ..... *B60W 10/06* (2013.01); *B60W 2510/0638* (2013.01); *B60W 2710/0666* (2013.01)

(58) Field of Classification Search
CPC ......... B60W 10/06; B60W 2510/0638; B60W 2710/0666
See application file for complete search history.

(56) References Cited

U.S. PATENT DOCUMENTS

| | | |
|---|---|---|
| 7,462,129 B2 | 12/2008 | Hrovat et al. |
| 7,748,362 B2 | 7/2010 | Whitney et al. |
| 8,010,258 B2 | 8/2011 | Tanaka et al. |
| 8,696,517 B2 | 4/2014 | Whitney et al. |
| 9,399,959 B2 | 7/2016 | Whitney et al. |
| 10,156,197 B1 | 12/2018 | Jin et al. |
| 10,513,256 B2 | 12/2019 | Meyer et al. |
| 11,518,362 B1 | 12/2022 | Shupe et al. |
| 2020/0391723 A1* | 12/2020 | Syed ............ B60W 20/40 |

FOREIGN PATENT DOCUMENTS

| | | | | |
|---|---|---|---|---|
| GB | 2594287 A | * | 10/2021 | ............ B60K 6/448 |
| JP | 2018204572 A | * | 12/2018 | ............... B60K 6/48 |

* cited by examiner

*Primary Examiner* — Tisha D Lewis
(74) *Attorney, Agent, or Firm* — Jeremy J. Klobucar

(57) ABSTRACT

A torque response adaptation system for a vehicle includes an engine control module (ECM) and a torque requestor module connected to the ECM via a controller area network (CAN) and configured to determine at least one of a torque response delay adaptation and a torque response magnitude adaptation, wherein the torque response delay and magnitude adaptations corresponds to a time delay and a magnitude difference, respectively, between a torque request provided to the ECM via the CAN and a corresponding torque response returned from the ECM via the CAN, generate a modified torque request for the ECM based on the at least one of the torque response delay adaptation and the torque response magnitude adaptation, and transmit, to the ECM via the CAN, the modified torque request, wherein receipt of the modified torque request by the ECM causes the ECM to increase performance of the vehicle.

20 Claims, 6 Drawing Sheets

VEHICLE TORQUE RESPONSE AND MAGNITUDE ADAPTION BASED ON CONTROLLER AREA NETWORK RESPONSE

FIELD

The present application generally relates to vehicle torque control and, more particularly, to techniques for vehicle torque response and magnitude adaptation based on controller area network (CAN) response.

BACKGROUND

Today's vehicles have a plurality of different controllers or modules that communicate with each other via a controller area network (CAN). One of these communications is a torque request/response to and from an engine control module (ECM) that controls an engine or its torque actuators. The torque request could originate from another controller or module, such as a transmission control module (TCM) controlling an upshift or downshift operation. There are delays in the transmission of messages via the CAN, and many control techniques utilize a predetermined CAN delay (e.g., a worst-possible CAN delay). The actual CAN delay, however, may vary even further due to environmental conditions, such as temperature and altitude. Thus, the control techniques may not be fully optimized and could result in sub-optimal performance (e.g., poor response or clunky shifts) and poor durability. Accordingly, while such conventional vehicle torque control systems do work for their intended purpose, there exists an opportunity for improvement in the relevant art.

SUMMARY

According to one example aspect of the invention, a torque response adaptation system for a vehicle is presented. In one exemplary implementation, the torque response adaptation system comprises an engine control module (ECM) configured to control an engine of the vehicle and a torque requestor module connected to the ECM via a controller area network (CAN), the torque requestor module being configured to determine at least one of a torque response delay adaptation and a torque response magnitude adaptation, wherein the torque response delay and magnitude adaptations correspond to a time delay and a magnitude difference, respectively, between a torque request provided to the ECM via the CAN and a corresponding torque response returned from the ECM via the CAN, generate a modified torque request for the ECM based on the at least one of the torque response delay adaptation and the torque response magnitude adaptation, and transmit, to the ECM via the CAN, the modified torque request, wherein receipt of the modified torque request by the ECM causes the ECM to increase performance of the vehicle.

In some implementations, the torque requestor module is a transmission control module (TCM) configured to control an automatic transmission of the vehicle, and wherein the increased performance of the vehicle includes a smoother shift operation of the automatic transmission.

In some implementations, the torque requestor module is configured to determine the torque response delay adaptation by sending, to the ECM via the CAN, a first torque request, receiving, from the ECM via the CAN, a first torque response corresponding to the first torque request, calculating the time delay based on a known time in relation to when the first torque request was sent and a time when the first torque response was received, and determining the torque response delay adaptation based on the calculated time delay. In some implementations, the known time in relation to when the first torque request was sent is an event flag for the torque requestor module. In some implementations, the torque requestor module is further configured to determine the torque response delay adaptation by sending, to the ECM via the CAN, a second torque request having the calculated time delay applied thereto, receiving, from the ECM via the CAN, a second torque response corresponding to the second torque request, verifying the torque response delay adaptation when the second torque response is received within a delay tolerance threshold from the sending of the second torque request, and further adjusting the torque response delay adaptation when the second torque response is not received within the delay tolerance threshold from the sending of the second torque request. In some implementations, the torque requestor module is further configured to determine the torque response magnitude adaptation by sending, to the ECM via the CAN, a third torque request, receiving, from the ECM via the CAN, a third torque response corresponding to the third torque request, calculating the magnitude difference between the third torque request and the third torque response, and determining the torque response magnitude adaptation based on the calculated magnitude difference.

In some implementations, the torque requestor module is configured to determine the torque response magnitude adaptation by sending, to the ECM via the CAN, a first torque request, receiving, from the ECM via the CAN, a first torque response corresponding to the first torque request, calculating the magnitude difference between the first torque request and the first torque response, and determining the torque response magnitude adaptation based on the calculated magnitude difference. In some implementations, the torque requestor module is further configured to determine the torque response magnitude adaptation by verifying that the first torque response excludes any interventions from another vehicle system. In some implementations, the torque requestor module is further configured to determine the torque response magnitude adaptation by sending, to the ECM via the CAN, a second torque request having the calculated magnitude difference applied thereto, wherein the second torque request is within an engine load threshold or engine speed threshold from the first a corresponding engine load or engine speed for the first torque request, receiving, from the ECM via the CAN, a second torque response corresponding to the second torque request, verifying the torque response magnitude adaptation when the second torque response is within a magnitude tolerance threshold from the second torque request, and further adjusting the torque response magnitude adaptation when the second torque response is not within not within the magnitude tolerance threshold from the second torque request. In some implementations, the torque requestor module is further configured to determine the torque response delay adaptation by sending, to the ECM via the CAN, a third torque request, receiving, from the ECM via the CAN, a third torque response corresponding to the third torque request, calculating the time delay based on a known time in relation to when the third torque request was sent and a time when the third torque response was received, and determining the torque response delay adaptation based on the calculated time delay.

According to another example aspect of the invention, a torque response adaptation method for a vehicle is presented. In one exemplary implementation, the torque response adaptation method comprises providing an ECM configured to control an engine of the vehicle including a plurality of torque actuators associated with the engine, providing a torque requestor module connected to the ECM via a CAN, determining, by the torque requestor module, at least one of a torque response delay adaptation and a torque response magnitude adaptation, wherein the torque response delay and magnitude adaptations correspond to a time delay and a magnitude difference, respectively, between a torque request provided to the ECM via the CAN and a corresponding torque response returned from the ECM via the CAN, generating, by the torque requestor module, a modified torque request for the ECM based on the at least one of the torque response delay adaptation and the torque response magnitude adaptation, and transmitting, by the torque requestor module to the ECM via the CAN, the modified torque request, wherein receipt of the modified torque request by the ECM causes the ECM to increase performance of the vehicle.

In some implementations, the torque requestor module is a TCM configured to control an automatic transmission of the vehicle, and wherein the increased performance of the vehicle includes a smoother shift operation of the automatic transmission.

In some implementations, the determining of the torque response delay adaptation further comprises sending, by the torque requestor module to the ECM via the CAN, a first torque request, receiving, by the torque requestor module from the ECM via the CAN, a first torque response corresponding to the first torque request, calculating, by the torque requestor module, the time delay based on a known time in relation to when the first torque request was sent and a time when the first torque response was received, and determining, by the torque requestor module, the torque response delay adaptation based on the calculated time delay. In some implementations, the known time in relation to when the first torque request was sent is an event flag for the torque requestor module. In some implementations, the determining of the torque response delay adaptation further comprises sending, by the torque requestor module to the ECM via the CAN, a second torque request having the calculated time delay applied thereto, receiving, by the torque requestor module from the ECM via the CAN, a second torque response corresponding to the second torque request, verifying, by the torque requestor module, the torque response delay adaptation when the second torque response is received within a delay tolerance threshold from the sending of the second torque request, and further adjusting, by the torque requestor module, the torque response delay adaptation when the second torque response is not received within the delay tolerance threshold from the sending of the second torque request. In some implementations, the determining of the torque response magnitude adaptation further comprises sending, by the torque requestor module to the ECM via the CAN, a third torque request, receiving, by the torque requestor module from the ECM via the CAN, a third torque response corresponding to the third torque request, calculating, by the torque requestor module, the magnitude difference between the third torque request and the third torque response, and determining, by the torque requestor module, the torque response magnitude adaptation based on the calculated magnitude difference.

In some implementations, the torque requestor module is configured to determine the torque response magnitude adaptation by sending, to the ECM via the CAN, a first torque request, receiving, from the ECM via the CAN, a first torque response corresponding to the first torque request, calculating the magnitude difference between the first torque request and the first torque response, and determining the torque response magnitude adaptation based on the calculated magnitude difference. In some implementations, the torque requestor module is further configured to determine the torque response magnitude adaptation by verifying that the first torque response excludes any interventions from another vehicle system. In some implementations, the torque requestor module is further configured to determine the torque response magnitude adaptation by sending, to the ECM via the CAN, a second torque request having the calculated magnitude difference applied thereto, wherein the second torque request is within an engine load threshold or engine speed threshold from a corresponding engine load or engine speed for the first torque request, receiving, from the ECM via the CAN, a second torque response corresponding to the second torque request, verifying the torque response magnitude adaptation when the second torque response is within a magnitude tolerance threshold from the second torque request, and further adjusting the torque response magnitude adaptation when the second torque response is not within the magnitude tolerance threshold from the second torque request. In some implementations, the torque requestor module is further configured to determine the torque response delay adaptation by sending, to the ECM via the CAN, a third torque request, receiving, from the ECM via the CAN, a third torque response corresponding to the third torque request, calculating the time delay based on a known time in relation to when the third torque request was sent and a time when the third torque response was received, and determining the torque response delay adaptation based on the calculated time delay.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, torque requests/responses are sent to and from an engine control module (ECM) that controls an engine or its torque actuators. The torque requests could originate, for example, at another controller or module (a "torque requestor module"), such as a transmission control module (TCM) controlling an upshift or downshift operation. There are inherent delays in the transmission of messages via the CAN, and many control techniques utilize a predetermined CAN delay (e.g., a worst-possible CAN delay) calibrated at a specific set of operation conditions that does not correspond to some regions whether the vehicle could operate. That is, the actual CAN delay may vary due to environmental conditions, such as temperature and altitude. The magnitude of the response could also vary due to component wear, such as torque actuator wear that decreases its speed and/or effectiveness. Thus, the existing control techniques may not be fully optimized and could result in sub-optimal performance (e.g., poor response or clunky shifts) and poor durability. Accordingly, improved techniques for vehicle torque response and magnitude adaptation based on CAN response are presented herein.

These techniques periodically adapt the existing control techniques. This adaptation could be to the torque response timing and/or the torque response magnitude. The response delay calculation involves transmitting a torque request via the CAN with a known magnitude from a requestor (e.g., the TCM) in relation to a known event or point in time (e.g., an event flag). Response delays for both a start and end of the torque request versus the torque response are calculated by leveraging the known event or point in time and then applied as offsets and checked to see if an adaptation tolerance is satisfied. The response magnitude calculation is similar and involves transmitting the same type of torque request via the CAN and then calculating a difference between the known request magnitude and the response magnitude and checking to see if an adaptation tolerance is satisfied. The response magnitude adaptation also ensures that other outside actuators (e.g., electronic stability control (ESC), friction brake control, battery regeneration or regenerative braking control, etc.) do not intervene and affect the response.

Figure 1:
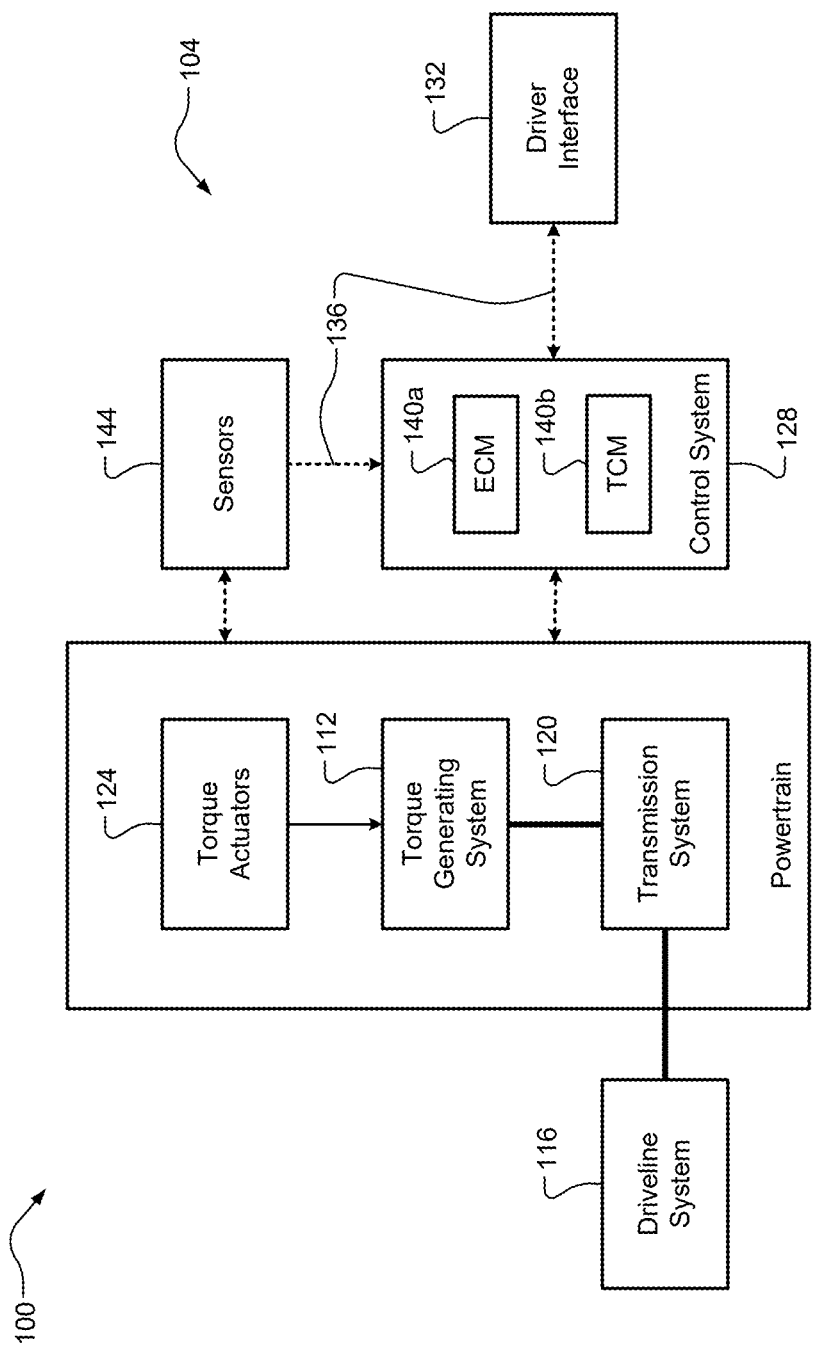
FIG. 1 illustrates a functional block diagram of a vehicle having an example controller area network (CAN) based torque response adaptation system according to the principles of the present application.

Referring now to FIG. 1, a functional block diagram of a vehicle 100 having an example CAN based torque response adaptation system 104 according to the principles of the present application is illustrated. The vehicle 100 includes a powertrain 108 comprising a torque generating system 112 that is configured to generate drive torque, which is transferred to a driveline system 116 via a transmission system 120. The torque generating system 112 could include an internal combustion engine, an electric traction motor, or some combination thereof. The driveline system 116 includes any suitable driveline components, such as axles/half-shafts, differentials, and wheels. The transmission system 120 includes a transmission (e.g., a multi-speed step-gear automatic transmission) and, in some cases, a fluid coupling such as a torque converter. The torque generating system 112 has a respective plurality of torque actuators 124, which are configured to actuate various sub-components of the torque generating system 112. When the torque generating system 112 includes an engine, for example, the torque actuators 124 include airflow actuators (throttle, intake/exhaust valves, etc.), fuel actuators (e.g., fuel injectors), and spark actuators (e.g., spark plugs). The torque generating system 112 is also referred to herein as "engine 112." A control system 128 controls operation of the vehicle 100 and, more particularly, controls the powertrain 108 to generate a desired amount of torque to satisfy a driver torque request. The driver torque request could be provided by a driver of the vehicle 100 via a driver interface 132 (e.g., an accelerator pedal).

The control system 128 could include one or more controllers configured to communicate with each other via a CAN 136. For example, the control system 128 could include an engine control module (ECM) 140a (or, for hybrid or electric-only applications, a different control module) and a torque requestor module 140b (e.g., a TCM). The term "ECM" as used herein could refer to the engine-specific controller 140a, one or more of the plurality of torque actuators 124, or some combination thereof (e.g., the engine-specific controller 140a as an intermediary between the torque requestor module 140b and one or more of the plurality of torque actuators 124). The control system 128 is also configured to receive measurements from a plurality of sensors 144. The sensors 144 are configured to measure various operating parameters such as, but not limited to, positions, speeds/accelerations, temperatures, fluid/barometric pressures, and electrical parameters (current, voltage, etc.). Two key operating parameters for purposes of the present application are ambient temperature (external to the vehicle 100) and barometric pressure, which is indicative of an altitude of the vehicle 100. For descriptive and illustrative purposes, communication between the a TCM example for the torque requestor module 140b and the ECM 140a will be specifically discussed herein, but it will be appreciated that the techniques of the present application could be applied to other pairs/sets of modules.

Figure 2:
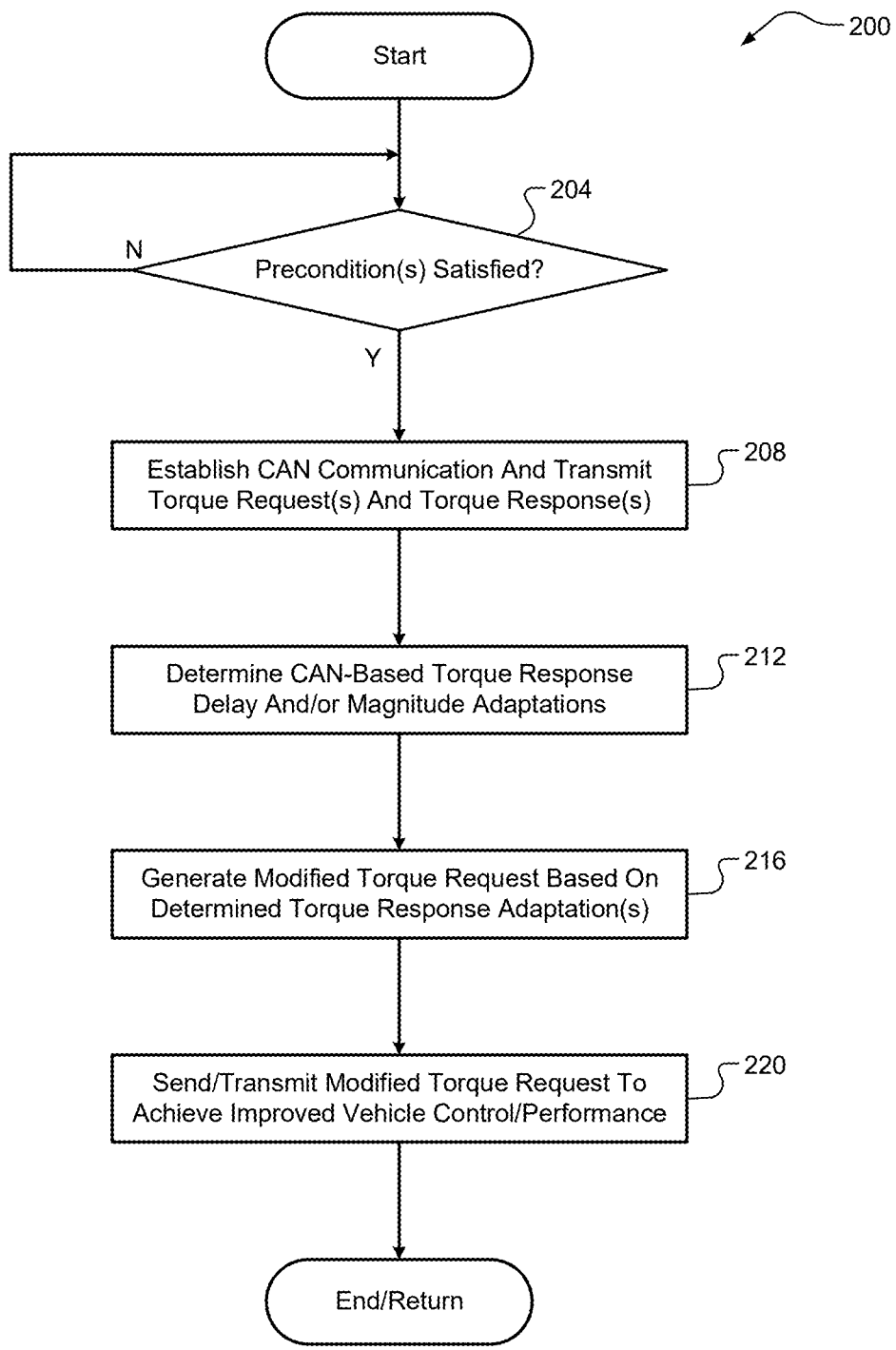
FIG. 2 illustrates a flow diagram of an example CAN based torque response adaptation method for a vehicle according to the principles of the present application.

Referring now to FIG. 2 and with continued reference to FIG. 1, a flow diagram of an example CAN based torque response adaptation method 200 for a vehicle according to the principles of the present application is illustrated. While the vehicle 100 and its components are specifically referenced herein for descriptive/illustrative purposes, it will be appreciated that this method 200 could be applicable to any suitably configured vehicle. The method 200 begins at 204 where the control system 128 determines whether an optional set of one or more preconditions are satisfied. These precondition(s) could include, for example only, the vehicle 100 being powered up and the engine 100 running and there being no malfunctions or faults present (e.g., CAN malfunctions) that would negatively impact or otherwise inhibit the operation of the techniques of the present application. When false, the method 200 ends or returns to 204. When true, the method 200 proceeds to 208. At 208, communication between the torque requestor module 140b and the ECM 140a is established via the CAN 136 and torque request(s) are send (from the torque requestor module 140b to the ECM 140a via the CAN 136) and corresponding torque response(s) are received back (at the torque requestor module 140b from the ECM 140a via the CAN 136.

After this exchanging of torque request(s)/response(s) via the CAN 136, at 212, the torque requestor module 140b determines at least one of a torque response delay adaptation and a torque response magnitude adaptation based on the exchanged torque request(s)/response(s). The torque response delay and magnitude adaptations corresponds to a time delay and a magnitude difference, respectively. At 216, the torque requestor module 140b generates a modified torque request for the ECM 140a based on the at least one of the torque response delay adaptation and the torque response magnitude adaptation. Finally, at 220, the torque requestor module 140b transmits, to the ECM 140a via the CAN 136, the modified torque request. The receipt of the modified torque request by the ECM 140a causes the ECM 140a to increase performance of the vehicle 100. For example, in the TCM example for the torque requestor module 140b, the increased performance of the vehicle includes a smoother shift operation of the transmission system 120 (e.g., the on-coming and off-going clutch(es) of an automatic transmission). The method 200 then ends or returns to 204 (or 208) for one or more additional cycles.

Figure 3A:
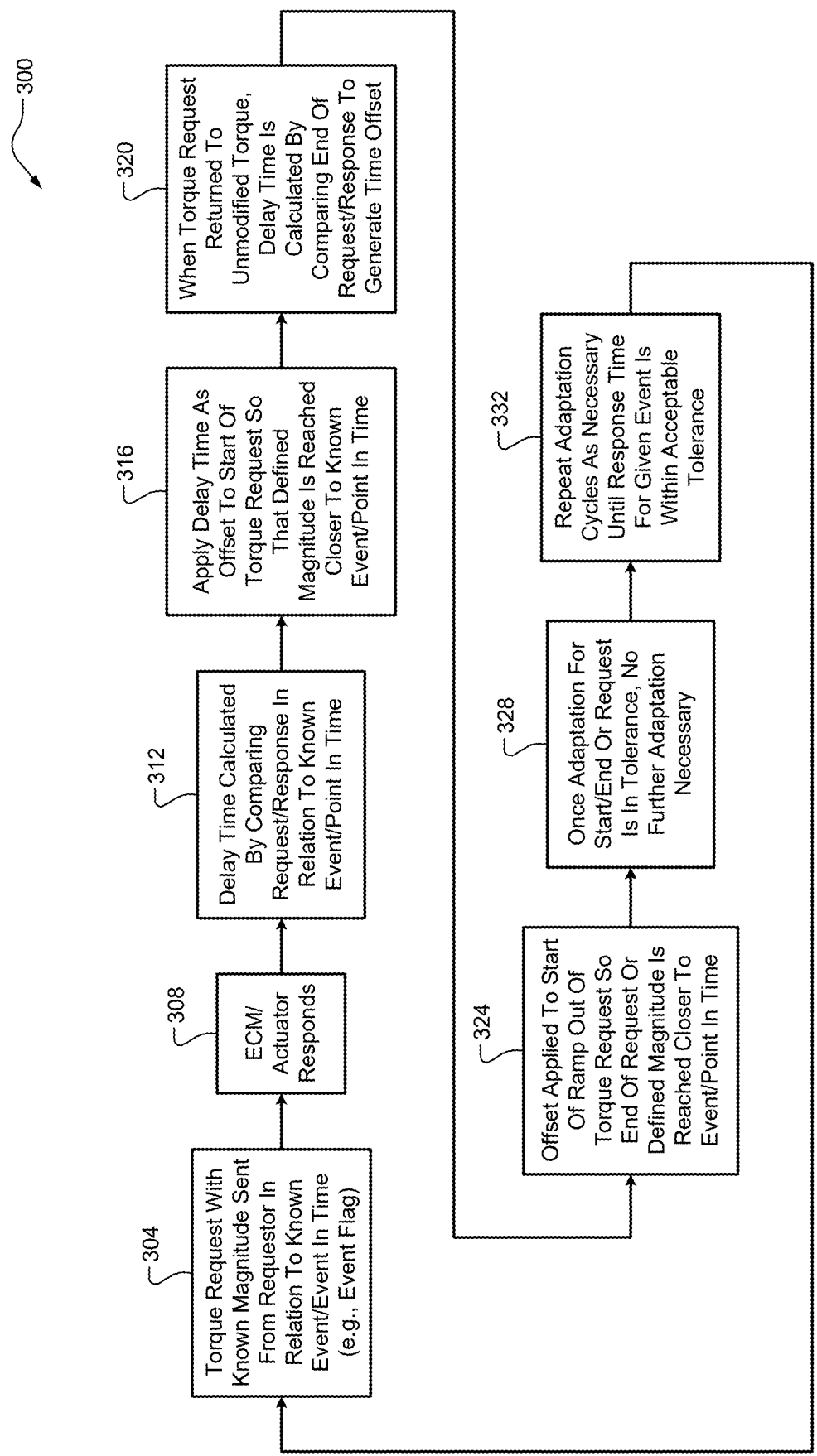
FIGS. 3A-3B illustrate a flow diagram and a plot of an example CAN based torque response delay adaptation method for a vehicle according to the principles of the present application.
Figure 3B:
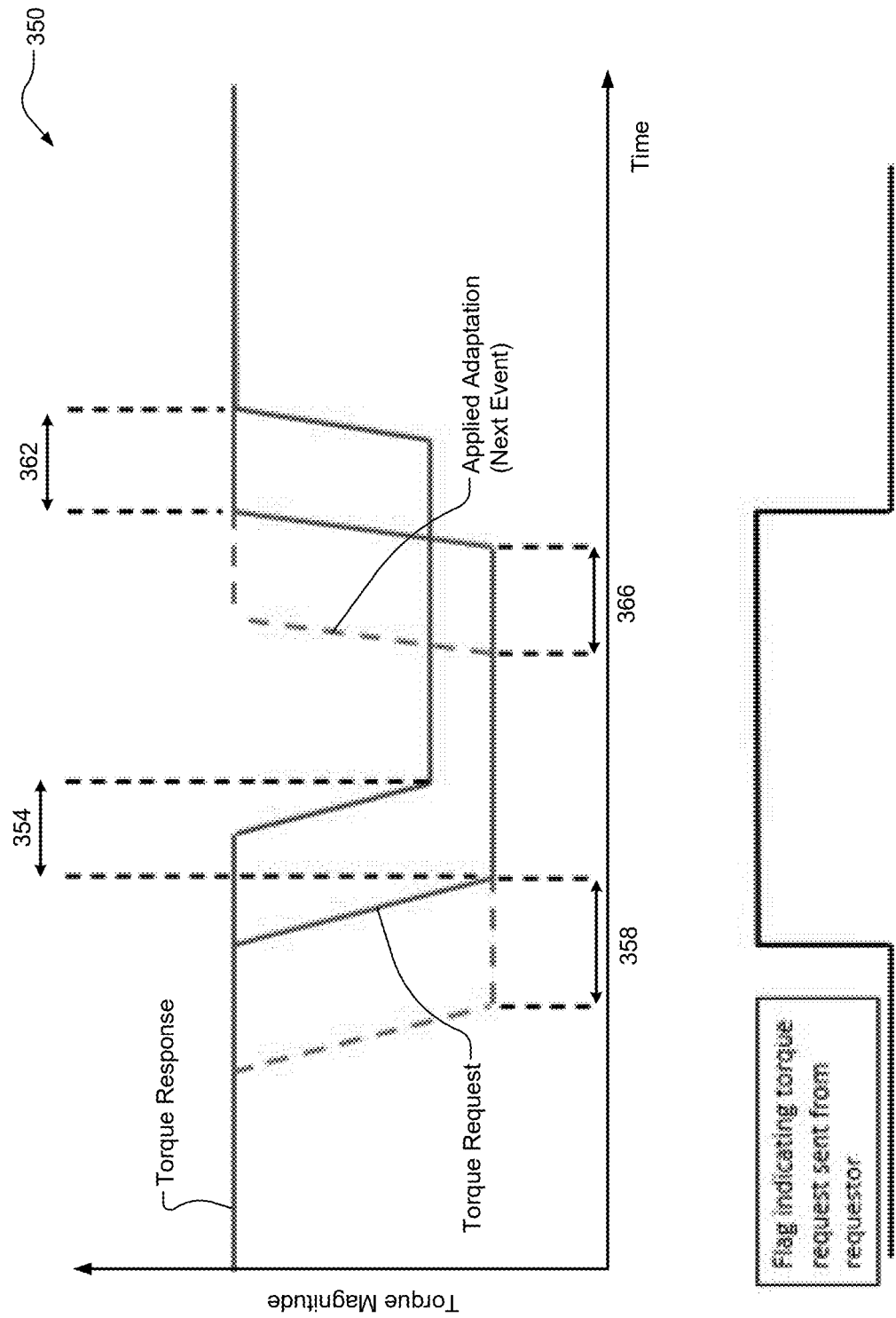

Referring now to FIGS. 3A-3B and with continued reference to the previous figures, a flow diagram and a plot 350 of an example CAN based torque response delay adaptation method 300 for a vehicle according to the principles of the present application are illustrated. This torque response delay adaptation method 300 could be part of steps 208-212 of the method 200 of FIG. 2. The method 300 begins at 304 where the torque requestor module 140*b* sends, to the ECM 140*a* via the CAN 136, a first torque request. This first torque request could have a known magnitude and could be sent in relation to a known time by the torque requestor module 140*b*. For example only, this known time could be an event flag of the torque requestor module 140*b* (e.g., a shift event flag of the TCM). At 308, the ECM 140*a* (or a corresponding torque actuator 124) responds to the first torque request with a corresponding torque response, which is received by the torque requestor module 140*b*. At 312, the torque requestor module 140*b* calculates a time delay (see reference 354) based on the known time and a subsequent time when the first torque response was received. At 316, the torque requestor module 140*b* applies the calculated time delay as an offset at a start of a second torque request (see reference 358). This is performed so that a defined magnitude is reached closer to the known time, which will be checked on a subsequent similar event.

At 320, when the first torque request (return to unmodified torque), the time delay is calculated by comparing the end of the first torque request and the end of the first torque response, which generates a time offset (see reference 362). At 324, the time offset is applied at the start of the ramp out of the second torque request (see reference 366), so that the end of the second torque request or the defined magnitude is reached closer to the known time, which will be checked in a subsequent similar event. At 328, once the torque response delay adaptation for the start/end of the second torque request verified or, for example, determined to be within a delay tolerance threshold (e.g., an acceptable time delay) from the sending of the second torque request, the final torque response delay adaptation is obtained and can be subsequently utilized. If unverified at 332, further adjusting the torque response delay adaptation can be performed until the response time to a given event is within the delay tolerance threshold (e.g., return to 304 and repeat).

Figure 4A:
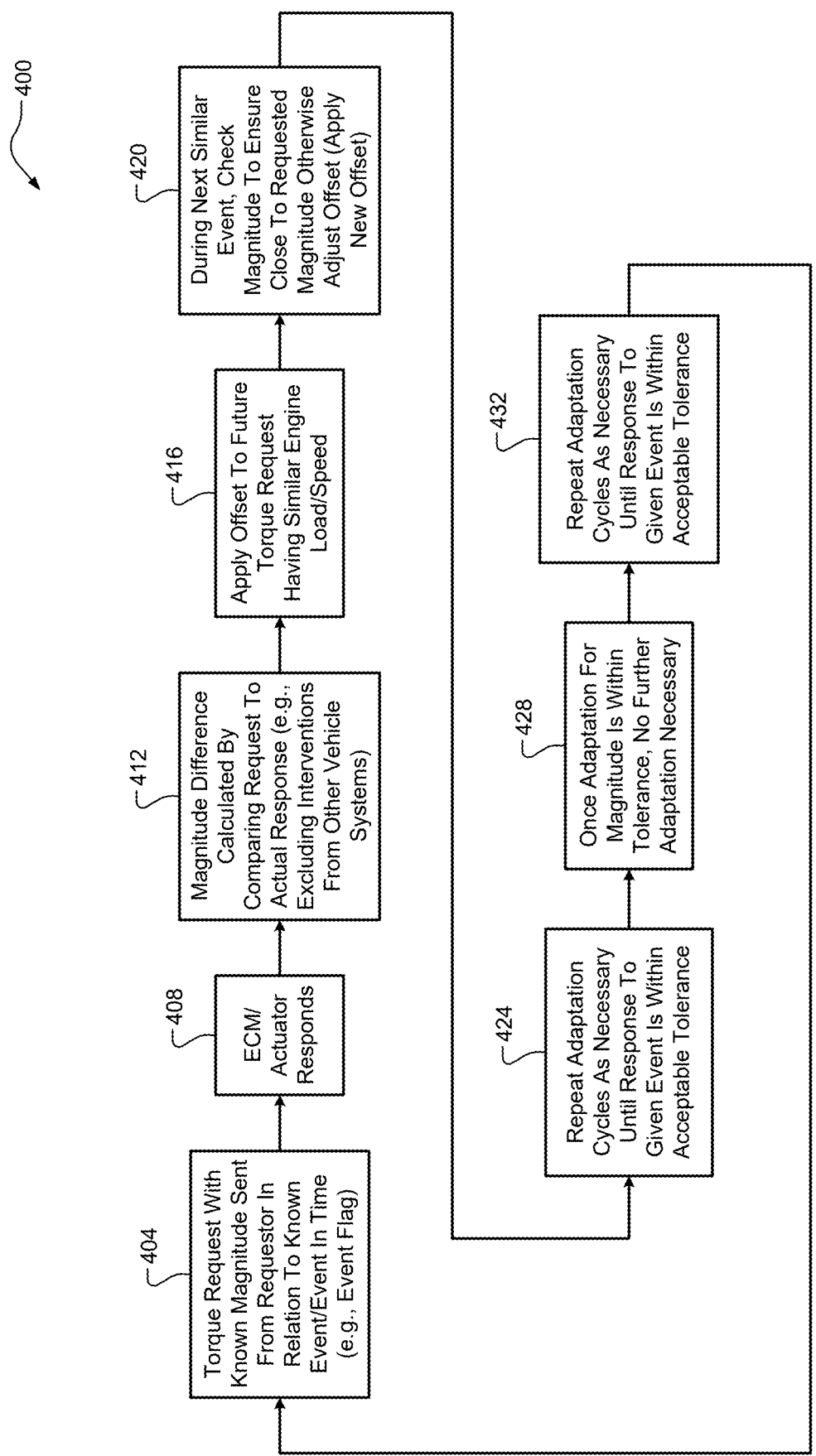
FIGS. 4A-4B illustrate a flow diagram and a plot of an example CAN based torque response magnitude adaptation method for a vehicle according to the principles of the present application.
Figure 4B:
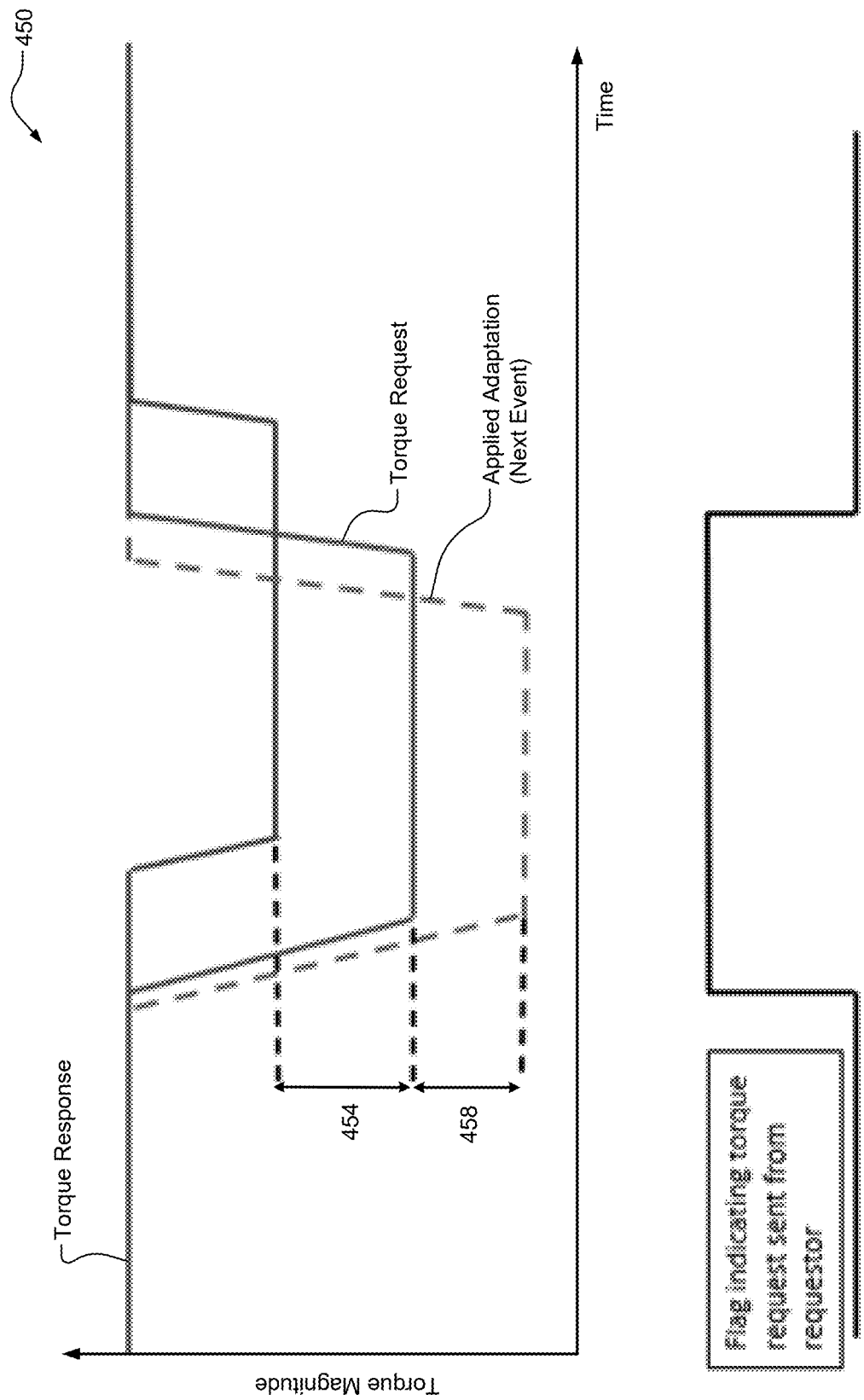

Referring now to FIGS. 4A-4B and with continued reference to the previous figures, a flow diagram and a plot 450 of an example CAN based torque response magnitude adaptation method 400 for a vehicle according to the principles of the present application are illustrated. This torque response delay adaptation method 400 could be part of steps 208-212 of the method 200 of FIG. 2. The method 400 begins at 404 where the torque requestor module 140*b* sends, to the ECM 140*a* via the CAN 136, a first torque request. This first torque request could have a known magnitude and could be sent in relation to a known time by the torque requestor module 140*b*. For example only, this known time could be an event flag of the torque requestor module 140*b* (e.g., a shift event flag of the TCM). At 408, the ECM 140*a* (or a corresponding torque actuator 124) responds to the first torque request with a corresponding torque response, which is received by the torque requestor module 140*b*. At 412, the torque requestor module 140*b* calculates a magnitude difference (see reference 454) based on the known magnitude of the first torque request and the actual magnitude of the first torque response that was received. This could further include verifying that the first torque response excluded or was not affected by any intervention by other vehicle systems (e.g., intervention that could have affected the magnitude of the first torque response), such as ESC, friction brake control, regenerative brake control, and the like.

At 416, the torque requestor module 140*b* applies the calculated magnitude difference as an offset at a start of a second torque request (see reference 458). This second torque request could be a subsequent torque request corresponding to a same or similar engine load or engine speed as the previous torque request (i.e., the first torque request). For example, the corresponding engine load/speed could be checked to see whether it is within a corresponding threshold amount from that of the previous torque request. During such a similar event, at 420, the torque response magnitude is checked to ensure that it is close to the requested magnitude or rather within a magnitude tolerance threshold (e.g., an acceptable magnitude difference). At 424, further adaptation cycles could be performed until the response is within an acceptable tolerance. Once verified at 428, the final torque response magnitude adaptation is obtained and can be subsequently utilized. If unverified at 432, further adjusting the torque response magnitude adaptation can be performed until the response to a given event is within the magnitude tolerance threshold or another acceptable tolerance (e.g., return to 404 and repeat).

To summarize, this invention involves the clutch control shift torque management logic and the corresponding reaction with the engine response. The implemented controls effect the upshift shift, down shift and any other control logic that involves sending or receiving a torque request from the engine or torque providing module. Engine/torque actuator response can be variable based on speed, torque reduction methods available, engine hardware protection, engine wear and environmental conditions. With this large variation in engine/torque actuator's ability to respond to a torque request can prevent the transmission from having desirable shift quality and or durability issues. There is currently no way to continually account for engine/torque actuator wear or customer location specific limitations. In addition, there are currently no known possible solutions to capture the situations in which engine/torque actuator response will be less than ideal. Currently, the transmission will suffer with bad shift quality and or poor durability. One existing solution was to set the response delay and magnitude while calibrating the vehicle (e.g., in a specific environment having specific elevation and thermal characteristics).

The new proposed solution involves allowing the transmission/control unit to automatically account for the deficiencies of the engine/torque actuator responses in a given customer specific environment. This can allow the shift quality and the actual torque request to align with the customer intended/expected response that was originally calibrated. This solution is different than previous solutions as it will allow for the transmission/control unit to automatically account for customer specific environmental conditions as well as the ability to help the transmission accommodate to the unpredictable engine response due to the conditions discussed above herein. The logic includes response detection controls and software that allows the transmission/torque requesting device (control unit) to send a torque request in relation to a shift or a known place/event in time via CAN and then look for a response from the engine/torque actuator via CAN. When the engine/torque actuator responds to the request the control unit software will automatically calculate the actuator response delay as well as the CAN delay based on the sent request and following response. This will then allow the software to shift the time in which the torque request is sent incrementally as to appropriately align the actual torque request up with the customer intended/expected response.

After the response delay is learned, the controls/logic will have the ability to automatically adapt the torque request magnitude accuracy by comparing the maximum requested torque to the actual torque reduced by the actuator/engine via CAN, which will then be able to increase or decrease the requested magnitude of torque in order to get the actual engine/actuator magnitude response closer to what was originally requested by the control unit. With this logic there will also be controls to prevent learning if the response or magnitude is within a given time or magnitude delta/percentage, as well as if there is another module requesting torque during the shift (ESC, for example). In addition to this logic is a separate set of adaption parameters and settings to account for barometric pressure, shift type/style and temperature in order to ensure that all of the areas that an engine/torque actuator struggles due to environmental conditions can be accounted for ensuring acceptable response.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A torque response adaptation system for a vehicle, the torque response adaptation system comprising:
   an engine control module (ECM) configured to control an engine of the vehicle; and
   a torque requestor module connected to the ECM via a controller area network (CAN), the torque requestor module being configured to:
      determine at least one of a torque response delay adaptation and a torque response magnitude adaptation, wherein the torque response delay and magnitude adaptations correspond to a time delay and a magnitude difference, respectively, between a torque request provided to the ECM via the CAN and a corresponding torque response returned from the ECM via the CAN;
      generate a modified torque request for the ECM based on the at least one of the torque response delay adaptation and the torque response magnitude adaptation; and
      transmit, to the ECM via the CAN, the modified torque request, wherein receipt of the modified torque request by the ECM causes the ECM to increase performance of the vehicle.

2. The torque response adaptation system of claim 1, wherein the torque requestor module is a transmission control module (TCM) configured to control an automatic transmission of the vehicle, and wherein the increased performance of the vehicle includes a smoother shift operation of the automatic transmission.

3. The torque response adaptation system of claim 1, wherein the torque requestor module is configured to determine the torque response delay adaptation by:
   sending, to the ECM via the CAN, a first torque request;
   receiving, from the ECM via the CAN, a first torque response corresponding to the first torque request;
   calculating the time delay based on a known time in relation to when the first torque request was sent and a time when the first torque response was received; and
   determining the torque response delay adaptation based on the calculated time delay.

4. The torque response adaptation system of claim 3, wherein the known time in relation to when the first torque request was sent is an event flag for the torque requestor module.

5. The torque response adaptation system of claim 4, wherein the torque requestor module is further configured to determine the torque response delay adaptation by:
   sending, to the ECM via the CAN, a second torque request having the calculated time delay applied thereto;
   receiving, from the ECM via the CAN, a second torque response corresponding to the second torque request;
   verifying the torque response delay adaptation when the second torque response is received within a delay tolerance threshold from the sending of the second torque request; and
   further adjusting the torque response delay adaptation when the second torque response is not received within the delay tolerance threshold from the sending of the second torque request.

6. The torque response adaptation system of claim 5, wherein the torque requestor module is further configured to determine the torque response magnitude adaptation by:
   sending, to the ECM via the CAN, a third torque request;
   receiving, from the ECM via the CAN, a third torque response corresponding to the third torque request;
   calculating the magnitude difference between the third torque request and the third torque response; and
   determining the torque response magnitude adaptation based on the calculated magnitude difference.

7. The torque response adaptation system of claim 1, wherein the torque requestor module is configured to determine the torque response magnitude adaptation by:
   sending, to the ECM via the CAN, a first torque request;
   receiving, from the ECM via the CAN, a first torque response corresponding to the first torque request;
   calculating the magnitude difference between the first torque request and the first torque response; and
   determining the torque response magnitude adaptation based on the calculated magnitude difference.

8. The torque response adaptation system of claim 7, wherein the torque requestor module is further configured to determine the torque response magnitude adaptation by verifying that the first torque response excludes any interventions from another vehicle system.

9. The torque response adaptation system of claim 8, wherein the torque requestor module is further configured to determine the torque response magnitude adaptation by:

sending, to the ECM via the CAN, a second torque request having the calculated magnitude difference applied thereto, wherein the second torque request is within an engine load threshold or engine speed threshold from the first a corresponding engine load or engine speed for the first torque request;

receiving, from the ECM via the CAN, a second torque response corresponding to the second torque request;

verifying the torque response magnitude adaptation when the second torque response is within a magnitude tolerance threshold from the second torque request; and further adjusting the torque response magnitude adaptation when the second torque response is not within the magnitude tolerance threshold from the second torque request.

10. The torque response adaptation system of claim 9, wherein the torque requestor module is further configured to determine the torque response delay adaptation by:

sending, to the ECM via the CAN, a third torque request;

receiving, from the ECM via the CAN, a third torque response corresponding to the third torque request;

calculating the time delay based on a known time in relation to when the third torque request was sent and a time when the third torque response was received; and determining the torque response delay adaptation based on the calculated time delay.

11. A torque response adaptation method for a vehicle, the torque response adaptation method comprising:

providing an engine control module (ECM) configured to control an engine of the vehicle;

providing a torque requestor module connected to the ECM via a controller area network (CAN);

determining, by the torque requestor module, at least one of a torque response delay adaptation and a torque response magnitude adaptation, wherein the torque response delay and magnitude adaptations correspond to a time delay and a magnitude difference, respectively, between a torque request provided to the ECM via the CAN and a corresponding torque response returned from the ECM via the CAN;

generating, by the torque requestor module, a modified torque request for the ECM based on the at least one of the torque response delay adaptation and the torque response magnitude adaptation; and transmitting, by the torque requestor module to the ECM via the CAN, the modified torque request, wherein receipt of the modified torque request by the ECM causes the ECM to increase performance of the vehicle.

12. The torque response adaptation method of claim 11, wherein the torque requestor module is a transmission control module (TCM) configured to control an automatic transmission of the vehicle, and wherein the increased performance of the vehicle includes a smoother shift operation of the automatic transmission.

13. The torque response adaptation method of claim 11, wherein the determining of the torque response delay adaptation further comprises:

sending, by the torque requestor module to the ECM via the CAN, a first torque request;

receiving, by the torque requestor module from the ECM via the CAN, a first torque response corresponding to the first torque request;

calculating, by the torque requestor module, the time delay based on a known time in relation to when the first torque request was sent and a time when the first torque response was received; and determining, by the torque requestor module, the torque response delay adaptation based on the calculated time delay.

14. The torque response adaptation method of claim 13, wherein the known time in relation to when the first torque request was sent is an event flag for the torque requestor module.

15. The torque response adaptation method of claim 14, wherein the determining of the torque response delay adaptation further comprises:

sending, by the torque requestor module to the ECM via the CAN, a second torque request having the calculated time delay applied thereto;

receiving, by the torque requestor module from the ECM via the CAN, a second torque response corresponding to the second torque request;

verifying, by the torque requestor module, the torque response delay adaptation when the second torque response is received within a delay tolerance threshold from the sending of the second torque request; and further adjusting, by the torque requestor module, the torque response delay adaptation when the second torque response is not received within the delay tolerance threshold from the sending of the second torque request.

16. The torque response adaptation method of claim 15, wherein the determining of the torque response magnitude adaptation further comprises:

sending, by the torque requestor module to the ECM via the CAN, a third torque request;

receiving, by the torque requestor module from the ECM via the CAN, a third torque response corresponding to the third torque request;

calculating, by the torque requestor module, the magnitude difference between the third torque request and the third torque response; and determining, by the torque requestor module, the torque response magnitude adaptation based on the calculated magnitude difference.

17. The torque response adaptation method of claim 11, wherein the determining of the torque response magnitude adaptation further comprises:

sending, by the torque requestor module to the ECM via the CAN, a first torque request;

receiving, by the torque requestor module from the ECM via the CAN, a first torque response corresponding to the first torque request;

calculating, by the torque requestor module, the magnitude difference between the first torque request and the first torque response; and determining, by the torque requestor module, the torque response magnitude adaptation based on the calculated magnitude difference.

18. The torque response adaptation method of claim 17, wherein the determining of the torque response magnitude adaptation further comprises verifying, by the torque requestor module, that the first torque response excludes any interventions from another vehicle system.

19. The torque response adaptation method of claim 18, wherein the determining of the torque response magnitude adaptation further comprises:

sending, by the torque requestor module to the ECM via the CAN, a second torque request having the calculated magnitude difference applied thereto, wherein the second torque request is within an engine load threshold or engine speed threshold from the first a corresponding engine load or engine speed for the first torque request;

receiving, by the torque requestor module from the ECM via the CAN, a second torque response corresponding to the second torque request;

verifying, by the torque requestor module, the torque response magnitude adaptation when the second torque response is within a magnitude tolerance threshold from the second torque request; and further adjusting, by the torque requestor module, the torque response magnitude adaptation when the second torque response is not within the magnitude tolerance threshold from the second torque request.

20. The torque response adaptation method of claim 19, wherein the determining of the torque response delay adaptation further comprises:

sending, by the torque requestor module to the ECM via the CAN, a third torque request;

receiving, by the torque requestor module from the ECM via the CAN, a third torque response corresponding to the third torque request;

calculating, by the torque requestor module, the time delay based on a known time in relation to when the third torque request was sent and a time when the third torque response was received; and determining, by the torque requestor module, the torque response delay adaptation based on the calculated time delay.

* * * * *